June 29, 1926.
I. M. RILES
1,590,908
PIPE COUPLING
Filed June 15, 1925
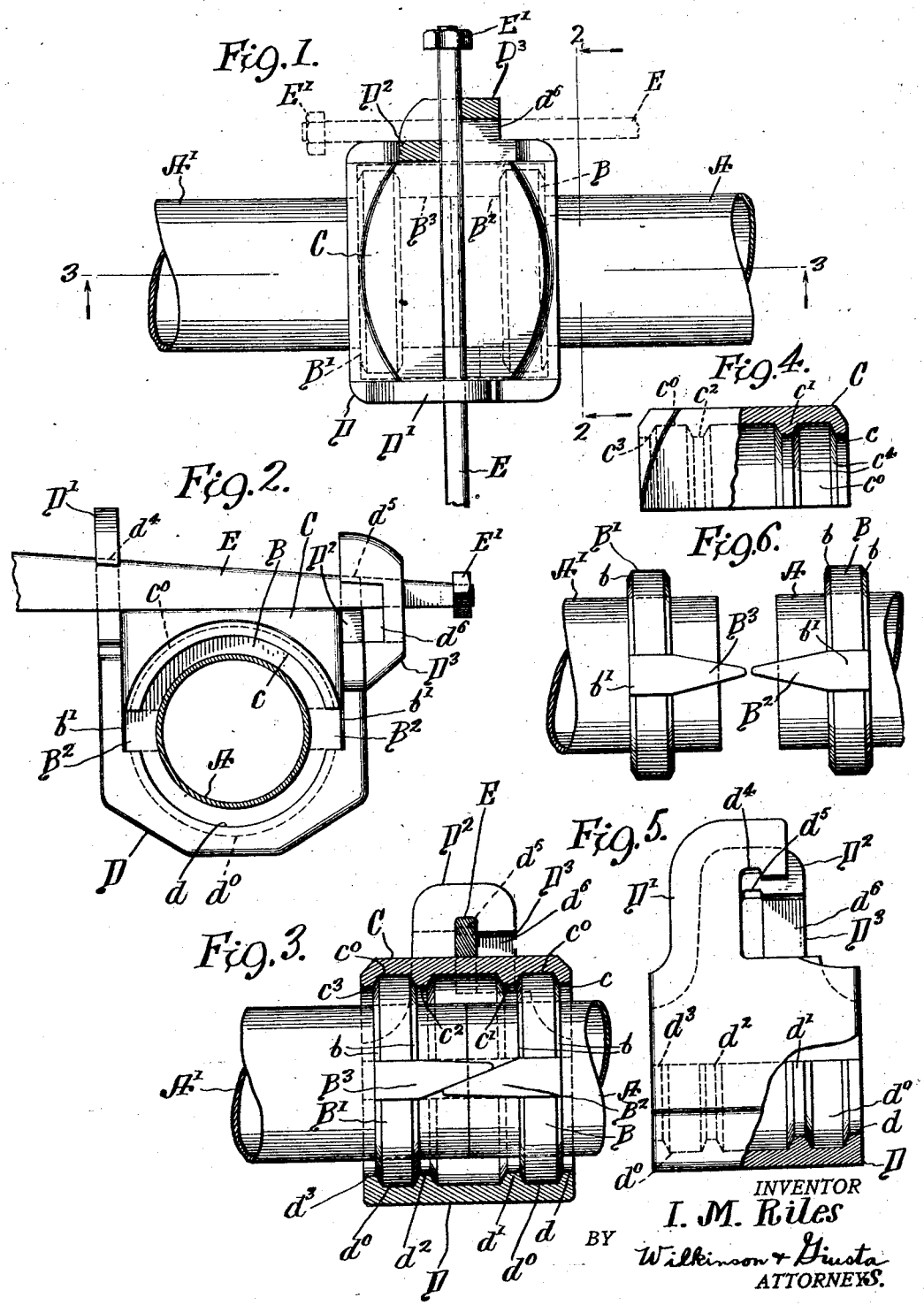
INVENTOR
I. M. Riles
BY Wilkinson & Giusta
ATTORNEYS.

Patented June 29, 1926.

1,590,908

UNITED STATES PATENT OFFICE.

IRA MAXEY RILES, OF TUSCALOOSA, ALABAMA.

PIPE COUPLING.

Application filed June 15, 1925. Serial No. 37,369.

My invention relates to improvements in pipe couplings and is intended to provide a fluid-proof connection for pipes for carrying fluids, such for instance as water, steam, gas, ammonia, or other fluid.

My invention is intended to provide a cheap and efficient coupling, which may be readily applied or removed from the pipes to be connected, and in which the parts are not apt to get lost.

These and other objects of the invention will be more fully understood after reference to the accompanying drawings, in which like parts are indicated by similar reference symbols throughout the several views, and in which:

Fig. 1 is a plan view of the two ends of a pipe line, coupled together with my improved coupling, parts being broken away;

Fig. 2 shows a section along the line 2—2 of Fig. 1, and looking in the direction of the arrows;

Fig. 3 shows a section along the line 3—3 of Fig. 1, and looking in the direction of the arrows;

Fig. 4 is a detail view partly in section, showing the end of the cap forming part of the coupling;

Fig. 5 is a detail showing the end of the housing block forming part of the coupling, parts being broken away; and Fig. 6 is a detail showing the two ends of the pipe being coupled together but spaced apart, and with the rubber gaskets mounted thereon.

A and A' represent the two ends of the pipe line which are to be connected together. These pipes may be of any desired size. B and B' represent two rubber gaskets in the form of rings beveled exteriorly as at $b$, and provided on each side with pointed tongues $B^2$ and $B^3$. These tongues project slightly beyond the circumference of the ring, as at $b'$, and the one tongue is apt to be pressed past the other when the parts are assembled, as shown in Fig. 3.

C represents the cap-piece, which is provided with ribs $c$, $c'$, $c^2$ and $c^3$, to form two annular grooves $c^0$, which are preferably beveled interiorly as at $c^4$ to engage and restrict the rubber gaskets B and B', as will be hereinafter described.

D represents the housing block forming part of the coupling, which is provided with beveled ribs $d$, $d'$, $d^2$ and $d^3$, forming between the same grooves $d^0$ to restrict and compress the rubber gaskets B and B', as will be hereinafter described.

This housing block is provided with two upwardly projecting ears D' and $D^2$. The ear D' is provided with a notch $d^4$ to engage the key E, as shown most clearly in Figs. 2 and 5, and the ear $D^2$ has a similar notch $d^5$ to engage the tapered end of the key, as shown in Fig. 2.

The key E is made in the form of a wedge, as shown in Fig. 2, and in order to prevent this wedge from being temporarily misplaced or lost, it may be attached to the housing block in any convenient way, as for instance by means of the head or nut E', secured to the tapered end of said key, as shown in Figs. 1 and 2. The projecting portion $D^3$ on the ear $D^2$, is provided with a slot $d^6$ at right angles to the notches $d^4$ and $d^5$, the notches $d^4$ and $d^5$ being in alignment when the parts are in the assembled position.

In order to assembled the parts, the rubber gaskets B and B' are put on the ends of the pipe to be joined, as shown in Fig. 6, and then the two ends of the pipe are brought together, causing the tongues $B^2$ and $B^3$ to overlap, as shown in Fig. 3; then the housing block D is put in place and the cap C is inserted in the same, so that the grooves $c^0$ and $d^0$ will register with the periphery of the gaskets B and B'. Then, swing the key in place from the position shown in dotted lines in Fig. 1 to the position shown in full lines in Figs. 1 and 2 and drive the key home, as towards the right in Fig. 2. This will cause the cap and the housing block to compress the gaskets snugly and uniformly in the grooves $c^0$ and $d^0$, and the straight edges of the cap and the housing block will also compress the top and bottom edges of the tongues $B^2$ and $B^3$, thus forming a fluid-tight joint and firmly securing the two ends of the pipe together.

In order to break the joint, drive the key E to the left in Fig. 2, and swing it out to the position shown in dotted lines in Fig. 1, and the cap may be removed and the housing block allowed to drop off. Then, the rubber gaskets may be removed from the ends of the pipe, if desired.

In ordinary practice, a single key and two gaskets, as shown, will be sufficient; but, if desired, several keys and gaskets may be used, especially where large pipes are to be coupled together.

It will be obvious that various changes in the construction, combination and arrangement of parts might be made, which could be used without departing from the spirit of my invention, and I do not mean to limit the invention to such details, except as particularly pointed out in the claims.

Having thus described my invention, what I desire to claim and secure by Letters Patent of the United States is:

1. A pipe coupling comprising a housing block and a cap adapted to fit therein, each provided with internally projecting ribs forming grooves, the said housing block being provided with oppositely disposed ears, each provided with an engaging notch, and one of said ears having a slot substantially at right angles to said notch, a tapered key adapted to be driven into engagement with said notches and to press down against said cap and to swing into said slot, and annular rubber gaskets adapted to slip over the ends of the pipe to be joined and to be compressed into said grooves under the action of said key.

2. A pipe coupling comprising a housing block and a cap adapted to fit therein, each provided with internally projecting ribs forming grooves, the said housing block being provided with oppositely disposed ears, each ear provided with an engaging notch, and one of said ears having a slot substantially at right angles to said notch, a tapered key adapted to be driven into engagement with said notches and to press down against said cap and to hold said block and cap firmly together, and to swing into said slot, and annular rubber gaskets adapted to slip over the ends of the pipe to be joined and to be compressed into said grooves under the action of said key, said gaskets being provided with oppositely disposed laterally projecting tapered tongues adapted to engage the edges of said block and cap, substantially as and for the purposes described.

3. In a pipe coupling, the combination with a housing block and a cap adapted to fit therein, each provided with internally projecting ribs forming grooves, the said housing block being provided with oppositely disposed ears, each ear provided with an engaging notch, and one of said ears having a slot substantially at right angles to said notch, of a tapered key adapted to be driven into engagement with said notches and to press down against said cap and to swing into said slot, and annular rubber gaskets mounted near the respective ends of the two pipes to be joined and compressed into said grooves under the action of said key.

4. In a pipe coupling, the combination with a housing block and a cap adapted to fit therein, each provided with internally projecting ribs forming grooves, the said housing block being provided with oppositely disposed ears, each ear provided with an engaging notch, and one of said ears having a slot substantially at right angles to said notch, of a tapered key adapted to be driven into engagement with said notches and to press down against said cap, and to swing into said slot, and annular rubber gaskets mounted near the respective ends of the two pipes to be joined and compressed into said grooves under the action of said key, said gaskets being provided with oppositely disposed laterally projecting tapered tongues adapted to engage the edges of said block and cap, substantially as and for the purposes described.

IRA MAXEY RILES.